United States Patent
Farnell et al.

(10) Patent No.: US 9,981,236 B2
(45) Date of Patent: May 29, 2018

(54) STEAM REFORMING

(71) Applicant: JOHNSON MATTHEY PLC, London (GB)

(72) Inventors: Peter William Farnell, North Yorkshire (GB); Martin Fowles, North Yorkshire (GB)

(73) Assignee: Johnson Matthey PLC, London, England (GB)

( * ) Notice: Subject to any disclaimer, the term of this patent is extended or adjusted under 35 U.S.C. 154(b) by 0 days. days.

(21) Appl. No.: 15/433,718

(22) Filed: Feb. 15, 2017

(65) Prior Publication Data

US 2017/0157585 A1 Jun. 8, 2017

Related U.S. Application Data

(60) Division of application No. 14/285,032, filed on May 22, 2014, now Pat. No. 9,604,200, which is a (Continued)

(30) Foreign Application Priority Data

May 24, 2005 (GB) .................................. 0510514.3

(51) Int. Cl.
  *B01J 8/02* (2006.01)
  *B01J 23/46* (2006.01)
  *B01J 21/04* (2006.01)
  *B01J 23/10* (2006.01)
  *B01J 21/06* (2006.01)
  *B01J 35/00* (2006.01)
(Continued)

(52) U.S. Cl.
  CPC ................. *B01J 8/02* (2013.01); *B01J 21/04* (2013.01); *B01J 21/066* (2013.01); *B01J 23/10* (2013.01); *B01J 23/464* (2013.01); *B01J 35/0006* (2013.01); *B01J 35/026* (2013.01); *C01B 3/40* (2013.01); *B01J 2208/027* (2013.01); *C01B 2203/0233* (2013.01); *C01B 2203/1041* (2013.01); *C01B 2203/1064* (2013.01); *C01B 2203/1082* (2013.01); *C01B 2203/1241* (2013.01)

(58) Field of Classification Search
  USPC ......................................................... 422/211
  See application file for complete search history.

(56) References Cited

U.S. PATENT DOCUMENTS 4,085,688 A 4/1978 Smith et al.
4,200,682 A * 4/1980 Sederquist ................ C01B 3/46
  429/415
(Continued)

FOREIGN PATENT DOCUMENTS

EP 0206535 A1 12/1986
EP 0625481 A1 11/1994

*Primary Examiner* — Paul Wartalowicz
(74) *Attorney, Agent, or Firm* — Baker & Hostetler LLP

(57) ABSTRACT

A process for the steam reforming of hydrocarbons comprises partially oxidizing a feedgas comprising a hydrocarbon feedstock with an oxygen-containing gas in the presence of steam to form a partially oxidized hydrocarbon gas mixture at a temperature >1200° C. and passing the resultant partially oxidized hydrocarbon gas mixture through a bed of steam reforming catalyst, wherein the bed comprises a first layer and a second layer, each layer comprising a catalytically active metal on an oxidic support wherein the oxidic support for the first layer is a zirconia.

15 Claims, 1 Drawing Sheet

Related U.S. Application Data continuation of application No. 11/915,513, filed as application No. PCT/GB2006/050097 on May 9, 2006, now Pat. No. 8,815,208.

(51) Int. Cl.
*B01J 35/02* (2006.01)
*C01B 3/40* (2006.01)

(56) References Cited

U.S. PATENT DOCUMENTS

| | | |
|---|---|---|
| 4,425,159 A | 1/1984 | Nixon |
| 4,618,451 A | 10/1986 | Gent |
| 5,075,277 A * | 12/1991 | Saiai ........................ B01J 23/10 502/332 |
| 5,258,349 A | 11/1993 | Dalla Betta et al. |
| 5,643,545 A | 7/1997 | Chen et al. |
| 5,755,841 A | 5/1998 | Boucot et al. |
| 6,293,979 B1 | 9/2001 | Choudhary et al. |
| 6,348,278 B1 | 2/2002 | LaPierre et al. |
| 8,815,208 B2 | 8/2014 | Farnell et al. |
| 2003/0083198 A1 | 5/2003 | Xu et al. |
| 2004/0014600 A1 | 1/2004 | Fukunaga |
| 2004/0082470 A1 | 4/2004 | Gandhi et al. |
| 2004/0141892 A1 | 7/2004 | Van Hasselt et al. |
| 2004/0179996 A1 | 9/2004 | Shan et al. |
| 2007/0172416 A1 | 7/2007 | Kawashima et al. |

* cited by examiner

STEAM REFORMING

CROSS REFERENCE TO RELATED APPLICATIONS

This application is a Divisional of U.S. patent application Ser. No. 14/285,032, filed May 22, 2014, now U.S. Pat. No. 9,604,200, issued Mar. 28, 2017, which is a Continuation of U.S. patent application Ser. No. 11/915,513, filed Nov. 26, 2007, now U.S. Pat. No. 8,815,208, issued Aug. 26, 2014, which is the U.S. National Phase application of PCT International Patent Application No. PCT/GB2006/050097, filed May 9, 2006, and claims priority of British Patent Application No. GB 0510514.3, filed May 24, 2005, the contents of all of which are incorporated herein by reference.

FIELD OF THE INVENTION

This invention relates to a process and apparatus for the catalytic steam reforming of a hydrocarbon and in particular to the catalytic steam reforming of a partially combusted hydrocarbon feedstock for the preparation of synthesis gas.

BACKGROUND OF THE INVENTION

Steam reforming is widely practised and is used to produce hydrogen streams and synthesis gas comprising hydrogen and carbon oxides for a number of processes such as ammonia and methanol synthesis and the Fischer-Tropsch process. Steam reforming may be performed over one or more stages, for example a hydrocarbon feedstock may be reacted with steam over a steam reforming catalyst in pre-reforming or primary reforming steps, followed by partial oxidation of the pre-reformed or partially reformed gas with an oxygen-containing gas, and the resulting gas stream then brought towards equilibrium over a steam reforming catalyst. The water-gas shift reaction also occurs. The reactions may be depicted as follows;

Steam/pre-reforming $C_xH_y + xH_2O \leftrightarrows xCO + (y/2+x)H_2$ 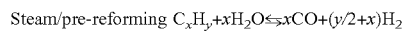

Partial Oxidation $C_xH_y + x/2O_2 \rightarrow xCO + y/2H_2$ 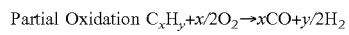

$C_xH_y + xO_2 \rightarrow xCO_2 + y/2H_2$ 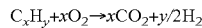

Water-Gas Shift $CO + H_2O \leftrightarrows CO_2 + H_2$ 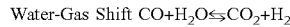

In order to obtain a synthesis gas more suited to a Fischer-Tropsch process, a primary or pre-reformed gas is typically subjected to secondary or autothermal reforming in a reformer by partially combusting the primary or pre-reformed gas using a suitable oxidant, e.g. air, oxygen or oxygen-enriched air in a burner apparatus mounted usually near the top of the reformer. The partial oxidation reactions are exothermic and the partial oxidation increases the temperature of the reformed gas to between 1200 and 1500° C. The partially combusted reformed gas is then passed adiabatically through a bed of a steam reforming catalyst disposed below the burner apparatus, to bring the gas composition towards equilibrium. Heat for the endothermic steam reforming reaction is supplied by the hot, partially combusted reformed gas. As the partially combusted reformed gas contacts the steam reforming catalyst, it is cooled by the endothermic steam reforming reaction to temperatures in the range 900-1100° C.

Typically the steam reforming catalyst in the secondary or autothermal reformer is a nickel catalyst supported on alumina or a magnesium-, or calcium-aluminate spinel, but precious metal catalysts can be used. For example EP 0206535 describes a secondary reforming process using a catalytically active metal from Group VIII of the Periodic Table, especially rhodium, wherein the catalyst support is a high purity alumina honeycomb structure.

EP-B-0625481 describes a steam reforming process in an autothermal reformer where, in order to prevent volatilised alumina refractory lining from the combustion zone in a reformer from depositing on the top surface of the steam reforming catalyst, the steam reforming catalyst comprises an upper layer and a lower layer, said upper layer having catalyst particles of reduced activity for the steam reforming reaction. Because of the reduced activity of the upper layer, it will be hotter than the lower layer, therefore preventing deposition of the volatilised refractory in the upper layer of the catalyst bed.

SUMMARY OF THE INVENTION

However, we have found that the volatilisation of alumina refractory does not occur to a significant extent unless the alumina is not properly fired or experiences very high temperatures, for example because of the burner configuration.

Furthermore, we have found that because of the high temperatures experienced at the surface of the reforming catalyst in a secondary or autothermal reformer, when the catalyst is supported on alumina or calcium aluminate, significant quantities of the support may be volatilised and deposited in cooler regions of the bed beneath the surface. This leads to erosion of the catalyst surface, which reduces its activity, and potentially also to increased pressure drop through the bed. Furthermore, different flows in different parts of the bed can cause one part of the bed to vaporise more quickly. This causes the catalyst to run hotter and the hot gases passing through the catalyst can carry a higher alumina loading as measured in mass flow terms at the saturation vapour pressure. This then has the effect of condensing volatilised support material out in that part of the bed just below the top of the bed. This increases the resistance to flow in that part of the bed and the flow pattern at the entrance to the catalyst bed can become disturbed. This partial blockage can radically affect the gas flow and mixing patterns within the combustion zone, which makes combustion problems more likely.

Therefore in contrast to EP 0206535, it is desirable that the catalyst at the surface of the bed is supported on a non-alumina, non-volatile support and in contrast to EP-B-0625481, we have found that it may also be desirable to provide a surface layer that has a higher activity than the remainder of the bed.

Accordingly the invention provides a process for the steam reforming of hydrocarbons comprising;
  i) partially oxidising a feedgas comprising a hydrocarbon feedstock with an oxygen-containing gas in the presence of steam to form a partially oxidised hydrocarbon gas mixture at a temperature >1200° C. and
  ii) passing the resultant partially oxidised hydrocarbon gas mixture through a bed of steam reforming catalyst, wherein the bed comprises a first layer and a second layer, each layer comprising a catalytically active metal on an oxidic support wherein the oxidic support for the first layer is a zirconia.

The invention further provides a bed of steam reforming catalyst, wherein the bed comprises a first layer and a second layer, each layer comprising a catalytically active metal on an oxidic support wherein the oxidic support for the first layer is a zirconia.

BRIEF DESCRIPTION OF THE DRAWINGS

The invention is further illustrated by reference to the examples below and to FIGS. 1 and 2, which depict calculated vapour pressure of support species or catalytically active metal species at a range of temperatures above 1200° C.

DETAILED DESCRIPTION OF THE INVENTION

Figure 1:
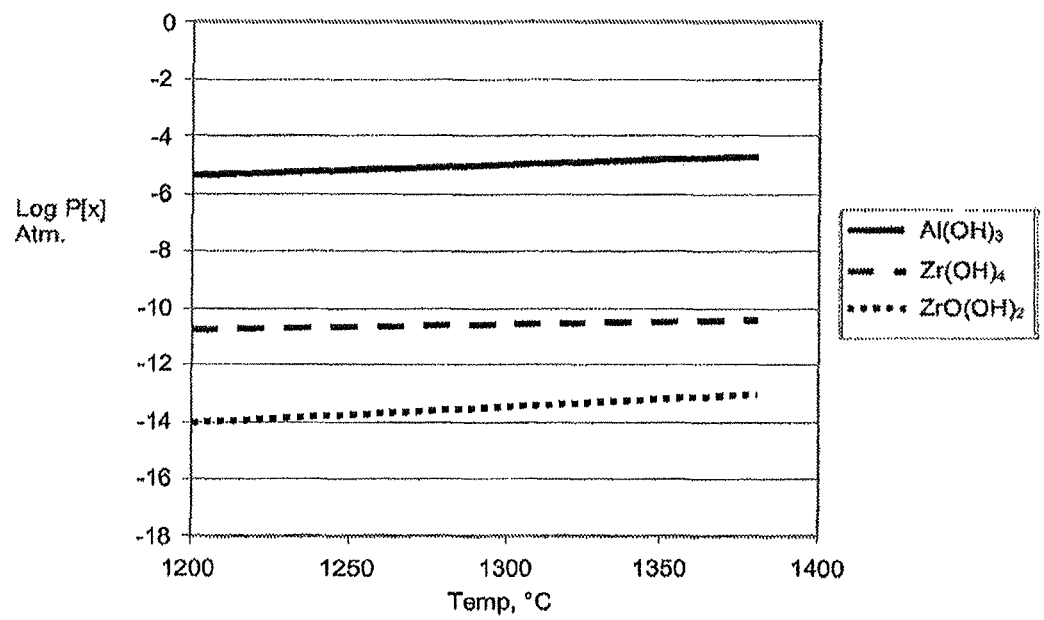

The feedgas may comprise a desulphurized hydrocarbon feedstock such as methane, natural gas or naphtha with a boiling point up to 200° C. which may be pre-heated to about 400-650° C., or may be a pre- or primary reformed gas stream comprising unreacted hydrocarbon, steam, hydrogen and carbon oxides. The latter are preferable as it may be desirable to ensure that the feed to the secondary reformer or autothermal reformer contains no hydrocarbons higher than methane and also contains a significant amount of hydrogen, as these factors reduce the risk of carbon/soot formation above/on the steam reforming catalyst.

The oxygen containing gas may be substantially pure oxygen, air or an oxygen enriched air. The amount of oxygen used preferably provides an an oxygen:carbon molar ratio in the range 0.4 to 0.7:1. Steam is preferably present at a steam:carbon ratio between 0.5 and 2, preferably 0.5-1.5, most preferably 0.5-1. Steam may be provided by adding it directly to the combustion zone or by mixing, either with the feedgas or the oxygen-containing gas. Alternatively, if the feedgas is a pre- or primary-reformed gas, no additional steam may be necessary. Furthermore, if the feedgas contains hydrogen, its combustion with oxygen will generate steam under the reaction conditions.

The hydrocarbon in the feedgas is partially oxidised by the oxygen in the oxygen-containing gas in the combustion zone of a suitable reformer such as a secondary or autothermal reformer.

The partially combusted hydrocarbon/steam mixture then passes from the combustion zone to the surface of the first layer of steam reforming catalyst at a temperature in the range 1200-1500° C. When the partially combusted feedgas/steam mixture, e.g. a partially combusted pre- or primary reformed gas, contacts the steam reforming catalyst, the steam reforming reaction, which is endothermic, cools the gas and the surface of the catalyst. The surface temperature of the catalyst may therefore, depending upon the conditions and activity of the catalyst, be in the range about 900-1400° C. In particular, we have found alumina or calcium aluminate volatilisation to occur when the catalyst temperature is above about 1200° C. Thus, preferably the first layer reduces the catalyst temperature below about 1200° C., more preferably below about 1100° C.

In the present invention, the first layer catalyst support is a zirconia. Preferred zirconia supports are stabilised zirconias, such as magnesia-, calcia-, lanthana-, yttria- or ceria-stabilised zirconias, which are most preferably in the cubic form. Such zirconias are known and are commercially available. Yttria-stabilised cubic zirconia is most preferred, e.g. a 16% wt yttria-stabilised cubic zirconia. Typically such stabilised zirconias have been fired to temperatures above 1200° C. We have found zirconia-containing supports to have lower volatility than supports comprising alumina or magnesium- or calcium-aluminate and so the presence in the first layer of alumina or magnesium- or calcium-aluminate is undesirable.

The catalytically active metal in the first layer of steam reforming catalyst may be nickel or another metal suitable for catalysing the steam reforming reaction such as cobalt, platinum, palladium, iridium, ruthenium or rhodium. Zirconia-supported nickel catalysts may contain nickel in an amount between 2 and 15%, preferably 3 and 8% by weight. Thus in one embodiment, the first layer comprises nickel on zirconia, preferably 3-8% by weight nickel on a stabilised zirconia.

Preferably, the catalytically active metal in the first layer of steam reforming catalyst forms compounds having a lower vapour pressure than the metal in the second layer. Where the second metal is nickel, catalytically active metals that form lower vapour pressure compounds under comparative reforming conditions include platinum and rhodium.

To further reduce the possibility of volatilisation of the first, i.e. upper, layer of catalyst, it desirably has a higher activity than the second layer, i.e. the catalytic activity of the first layer is higher relative to that of the second. By increasing the catalytic activity of the first layer, the endothermic steam reforming reactions take place to a greater extent and thereby act to cool the gas stream passing through the bed more rapidly than in the case where the layer of increased activity is absent. Preferably the catalytic activity of the second layer of steam reforming catalyst is between 1 and 95% of the catalytic activity of that of the first layer, more preferably between 50 and 95%.

Increased catalytic activity may be achieved by providing the first layer of steam reforming catalyst with a catalytically active metal with a higher activity per gram for the steam reforming reaction than the catalytically active metal of the second layer, i.e. the nickel may be replaced by sufficient amount of a more active catalyst for the steam reforming reaction. Such more catalytically-active metals include platinum, palladium, iridium, ruthenium and rhodium. Rhodium is particularly preferred as it also forms compounds with a lower vapour pressure than nickel under typical reaction conditions. Suitably active rhodium catalysts comprise 0.01-1.00% preferably 0.05 to 0.5%, more preferably 0.1 to 0.25% Rh by weight.

A particularly preferred first layer catalyst therefore consists of a rhodium impregnated zirconia catalyst, particularly a 0.05 to 0.5% wt rhodium-impregnated stabilised zirconia.

The second, i.e. lower, layer preferably comprises a nickel catalyst on a suitable refractory support. The refractory catalyst support for the second layer may also comprise zirconia, but for reasons of cost may alternatively comprise alumina, calcium aluminate, titania or magnesia or mixtures thereof. More preferably, the second layer catalyst consists of nickel on alumina or calcium aluminate.

The first and/or second layer of reforming catalysts may be particulate, in the form of shaped units such as pellets, rings or extrudates, which may be lobed or fluted. Alternatively, the first and/or second layer may comprise one or more monolithic supports such as a metal, ceramic foam or honeycomb supporting the catalytically-active metal. For example, the first and second layers may both comprise shaped units or may comprise a layer of shaped units over or under one or more monoliths. Preferably the first layer is a particulate catalyst, more preferably 4-hole cylinder, particularly one that is a lobed or fluted to provide a higher geometric surface area than a similarly sized solid cylinder without increasing pressure drop through the layer.

Steam reforming catalysts are typically made using impregnation methods well known to those skilled in the art of catalyst manufacture. For example nickel or rhodium may be provided in the first layer steam reforming catalyst by impregnation of the zirconia support with a solution of a suitable nickel or rhodium compound, for example an aqueous solution of metal acetate or nitrate, followed by heating in air to convert the compound to nickel or rhodium oxide. The nickel or rhodium oxide may then be reduced to elemental form by treatment with a reducing gas such as hydrogen at elevated temperature, although it is generally more convenient to install the catalyst in the un-reduced oxidic form and perform the reduction in-situ by reaction with a reducing gas (hydrogen and/or carbon monoxide). For example, a rhodium catalyst may be prepared by impregnating a stabilised cubic zirconia with an aqueous solution of rhodium nitrate, if necessary separating the impregnated material from the solution, drying and calcining to 400-500° C. The rhodium oxide, $Rh_2O_3$, is subsequently reduced in-situ. In a preferred embodiment, the rhodium is provided on the support as a so-called "eggshell" catalyst in which the rhodium is concentrated in the surface layers of the catalyst support rather than being distributed evenly throughout the support. This provides a more efficient use of the rhodium, which is expensive, compared to e.g. nickel.

If desired a layer of zirconia balls, pellets or tiles may be placed on top of the first layer of reforming catalyst to protect the surface of the steam reforming catalyst from irregularities in the combusting gas flow. A benefit of providing this layer is to prevent disturbance of the surface of the bed.

The catalytic activity of the first layer of catalyst may be further enhanced by providing the catalyst in a form having a higher geometric surface area (GSA) than the second layer. The geometric surface area of a catalyst may be calculated from its support dimensions. Increasing the GSA has the effect of increasing the surface area of catalytically active metal and thereby increasing the potential for the steam reforming reaction within the first layer. Where the steam reforming catalyst layers are particulate, this may be achieved by providing the first layer with particles of a smaller cross-sectional area than those of the second layer, or preferably by providing the first layer with particles of the same cross-sectional area, but having one or more holes, flutes or lobes therein. This latter method has the advantage that the pressure drop through the bed of steam reforming catalyst may be maintained at an acceptable value while increasing the activity of the first layer. Where a higher GSA material is provided as the first catalyst layer, preferably an inert layer of zirconia balls, pellets or, tiles is provided on top to protect the surface of the steam reforming catalyst from the combusting gas flow.

Thus in one embodiment the first layer consists of a particulate catalyst, preferably 0.05 to 0.5% wt Rh on a stabilised zirconia, in the form of a 4-holed pellet with a GSA of about 420 $m^2$ per cubic meter, over a particulate 5-20% wt Ni on alumina catalyst in the form of a 4-holed pellet of the same GSA.

In a further embodiment, the first layer comprises a particulate catalyst, preferably 0.05 to 0.5% wt Rh on a stabilised zirconia in the form of a 4-holed pellet with a GSA of about 420 $m^2$ per cubic meter over a monolithic alumina honeycomb supporting 5-20% wt Ni having a lower GSA.

The thickness of the bed of the steam reforming catalyst will depend upon the activity of the catalytically active metals, the conditions under which it is operated and whether the feedgas is a hydrocarbon/steam mixture or a pre- or primary-reformed gas. The thickness of the bed of steam reforming catalyst may be in the range 1-10 meters, preferably 3-5 meters with the first layer preferably comprising between 1 and 50%, preferably 3 and 25%, more preferably 5 and 15% of the thickness of the bed.

It will be understood by those skilled in the art that it may be useful to graduate the activity of the steam reforming catalyst through the bed. Therefore the second layer may comprise two or more successive layers of a steam reforming catalyst, the third or further layers having a lower catalytic activity than that preceding it.

EXAMPLES

Although the invention is illustrated and described herein with reference to specific embodiments, the invention is not intended to be limited to the details shown. Rather, various modifications may be made in the details within the scope and range of equivalents of the claims and without departing from the invention.

Example 1 Calculated Example

Thermodynamic calculations on vapour pressure of different Ni and Al species above 1200° C. indicate that the alumina and nickel are reacting with the reformed gas. The reaction is predominantly with the steam and this produces hydroxides as shown below.

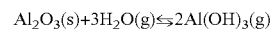

There are other potential reactions forming other suboxides and hydroxides and the predicted vapour pressure of the most volatile aluminium species at 1,250° C. is $6.2 \times 10^{-6}$ atm and for the most volatile nickel species $1.1 \times 10^{-6}$ atm under conditions typically found in an autothermal or secondary reformer. Based on certain assumptions about the partial steam pressure and temperature of the surface of the steam reforming catalyst, this could, in a reformer designed for a 4,000 mtpd methanol plant where the autothermal reformer processes 8,000 mtpd of reformed gas, vaporise and condense approximately 4.4 kg/day of alumina from the top of the catalyst bed. Over a 4-year catalyst life this could amount to as much as 6.2 te. In the hypothetical 4,000 mtpd methanol plant, the autothermal reformer would be expected to contain of the order of 80 te of catalyst, thus 8% of the catalyst may move in the lifetime of the catalyst charge.

Tests on alumina-supported catalysts in full-scale reformers have confirmed a close correlation of the plant data to the thermodynamic data, which supports, the theoretical figures.

Furthermore, the effective vapour pressures of Pt and Rh are lower than the effective vapour pressure of Ni under simulated reforming conditions. Under simulated secondary reformer conditions (1 bar, 5% methane in nitrogen and steam, with a steam to carbon ratio of 3.0) nickel, platinum or rhodium catalysts on the same alumina support material were heated until the temperature reached 1200° C. When the temperature approached 1200° C., the reforming activity, as measured by methane slippage, was observed to decline with the nickel-containing catalyst but was maintained for the platinum and rhodium catalysts. Analysis showed that nickel had volatilised and migrated downstream to cooler parts of the reactor.

Figure 2:
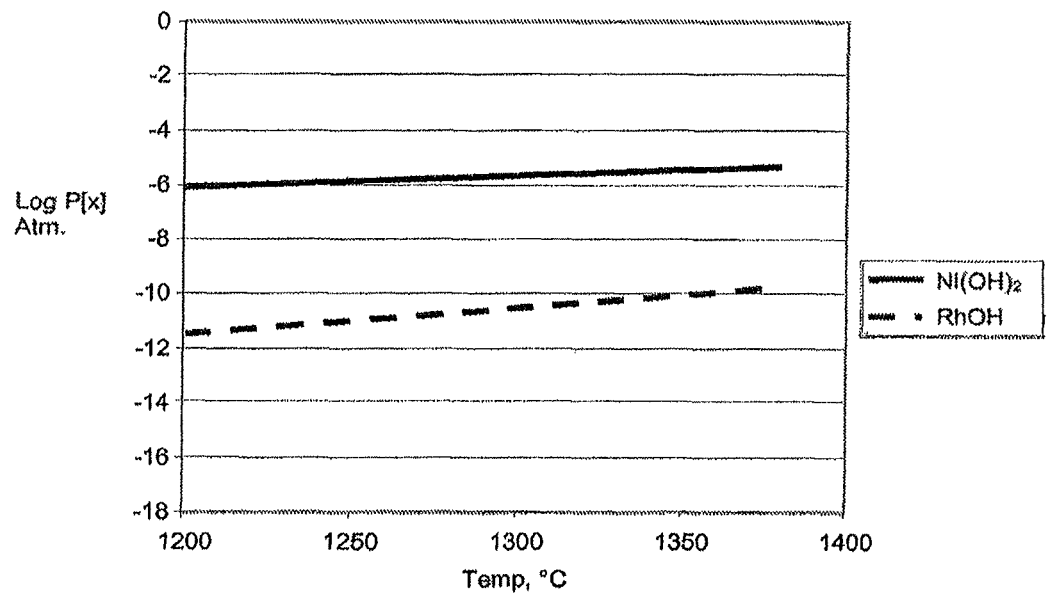

FIG. 1 depicts the calculated vapour pressure of species formed with alumina and zirconia supports over a range of temperatures above 1200° C. at conditions typically found in an autothermal or secondary reformer. It shows that zirconia is considerably less volatile than alumina. FIG. 2 depicts the calculated vapour pressures of species formed with nickel and rhodium catalysts over a range of temperatures above 1200° C. It shows that rhodium is considerably less volatile than nickel.

Thus rhodium on stabilised zirconia catalysts by comparison have vapour pressures orders of magnitude lower than alumina and nickel. Based on this, the amount of catalyst vaporisation and transfer downstream will very small. In the case calculated above, over a 4 yr period 6,200 Kg of $Ni/Al_2O_3$ catalyst could be vaporised. Using $Rh/ZrO_2$ the amount of material vaporised would be reduced to the order of 0.06 Kg over 4 years. As the active metal is also refractory, there is no loss of the active component either, resulting in a catalyst that retains activity at the top of the bed for longer.

Furthermore, rhodium exhibits a specific activity/g between 2 and 3 times that of nickel. With a 2 to 3 fold increase in specific activity, the gas temperature can be reduced from the inlet temperature of 1,250° C. to less than 1,100° C. in the layer of the rhodium/zirconia catalyst before entering the main bed of standard nickel on alumina. A reduction in the maximum gas temperature flowing over nickel/alumina catalyst from 1,250° C. to 1,100° C. will reduce the saturated vapour pressure by a factor of 4, giving a substantial decrease in the transfer of alumina down the bed.

Calculations have been performed on three cases looking at the amount of alumina that may be transported in an autothermal reformer. The calculations were based on the hypothetical 4,000 mtpd methanol plant autothermal reformer operated at the same assumed partial steam pressure and catalyst surface temperature already discussed above.

The first case, not according to the present invention, is an autothermal reformer charged with a bed of alumina lumps over a bed of large low activity cylinders on top of standard single hole ring catalyst. The catalysts are all standard nickel on alumina, although the large cylinders have 50% less nickel making them lower activity. This bed would vaporise 4.4 kg/day of alumina, principally from the alumina lumps at the top of the bed and condense 4.1 kg/day of this back into the bed, 3.1 kg/day of which would condense out in the top 0.5 m of the large cylindrical catalyst. This would be the most problematical part of the bed, slowly blocking up and increasing resistance to flow. The rest of the alumina would be spread throughout the remaining 3.5 m of catalyst. 0.3 kg/day of alumina vapour would pass downstream to cause fouling of the waste heat boiler or other heat transfer surfaces.

The second case, also not according to the present invention, is the same autothermal reformer charged with the same bed except that the alumina lumps have been removed. This bed would vaporise 1.9 kg/day of alumina from the first 0.3 m of cylindrical catalyst and condense 1.6 kg/day of this back into the bed, 0.7 kg/day of which would condense out in a band 0.3 m deep near the top of the bed. Whilst this is a large improvement on the case above, it still represents a substantial transfer of catalyst over a 4 year catalyst cycle. The rest of the alumina would be spread throughout the remaining 3.5 m of catalyst. 0.3 kg/day of alumina vapour would pass downstream to cause fouling of the waste heat boiler or other heat transfer surfaces.

In the third case, according to the present invention, a bed is charged with an upper layer of a rhodium-impregnated zirconia in the form of a lobed 4-hole cylinder on top of standard Ni-alumina single hole ring catalyst. In this case, enough activity is installed in the bed to reduce the gas temperature to 1,100° C. before it enters the bed of standard nickel on alumina ring catalyst. This bed would vaporise 0.7 kg/day of alumina from the top 0.2 m of the nickel on alumina rings and condense 0.4 kg/day of this back into the bed spread throughout the remaining perhaps 3.5 m of catalyst. This is a substantial improvement on the cases above and this bed would probably not exhibit any real pressure drop increase over a 4 yr period. 0.3 kg of alumina vapour would pass downstream to cause fouling of the waste heat boiler or other heat transfer surfaces.

Example 2

Comparison of the Mass Loss from Alumina and Zirconia Supported Rh Catalysts

At an industrial scale, a primary reformed natural gas stream was fed to a secondary reformer at where it was subjected to partial oxidation in a combustion zone with an oxygen stream fed via burner apparatus disposed near the top of the reformer and passed downwards from the combustion zone to a bed of steam reforming catalyst. The oxygen:gas ratio was 0.48-0.49.

The bed of steam reforming catalyst was 4 meters thick and comprised 4-hole cylindrical pellets. The top 10% (0.4 m) of the bed comprised pellets of either (a) rhodium on alumina or (b) rhodium on stabilised zirconia. The lower 90% of the bed comprised a standard nickel on alumina catalyst. The steam reforming catalysts were provided to the reformer in oxide form and reduced in-situ. The reforming process was operated over an extended period for both rhodium catalysts and the weight loss measured for pellets from throughout the first top layer.

The average weight loss was then calculated.

The catalysts pellets were as follows

| Catalyst (as supplied to reformer) | Diameter (nm) | Length (nm) | Hole diameter (nm) | GSA ($m^2 m^3$) |
|---|---|---|---|---|
| (a) 0.15% wt $Rh_2O_3/Al_2O_3$ | 11 | 15 | 3 | 530 |
| (b) 0.15% wt $Rh_2O_3$/16% wt $Y_2O_3/ZrO_4$ | 11 | 12 | 3 | 560 |

The average process conditions and weight loss/pellet in grams/day are as follows;

| Catalyst | Time On-line (days) | Primary reformer Flow Natural Gas Nm$^3$hr$^{-1}$ | Primary Reformer Steam:carbon ratio | Pressure (atm) | Secondary Reformer Inlet Temp. (° C.) | Secondary Reformer Exit Temp (° C.) | Mass Loss/pellet g/day |
|---|---|---|---|---|---|---|---|
| Rh/Al$_2$O$_3$ | 647 | 5407 | 3 | 39 | 668 | 990 | $1.4 \times 10^{-3}$ |
| Rh/Y$_2$O$_3$/ZrO$_4$ | 90 | 6250 | 3 | 39 | 681 | 1014 | $1.6 \times 10^{-4}$ |

The results demonstrate a lower erosion rate for the stabilised zirconia-supported catalyst, despite the harsher temperature conditions and higher GSA.

What is claimed:

1. A system for steam reforming hydrocarbons, the system comprising a reformer vessel, the reformer vessel comprising a bed of steam reforming catalyst, wherein the bed comprises a first layer and a second layer, each layer comprising a catalytically active metal on an oxidic support wherein the first layer is superposed on the second layer, and further wherein
   the catalytically active metal in the first layer is selected from the group consisting of platinum, palladium, iridium, ruthenium or rhodium, and the oxidic support for the first layer is a zirconia,
   the catalytically active metal in the second layer is nickel and the oxidic support for the second layer is a refractory support selected from the group consisting of zirconia, alumina, calcium aluminate, magnesium aluminate, titania, magnesia and a mixture thereof; wherein
   the reformer vessel is configured to pass a feed gas through the first layer and then through the second layer of the bed of steam reforming catalyst.

2. The system of claim 1 further comprising a layer of zirconia balls, pellets or tiles placed on top of the first layer of reforming catalyst.

3. The system of claim 1 wherein at least one of the first layer and the second layer reforming catalysts are particulate, or comprise one or more monolithic supports.

4. The system of claim 1 wherein the first layer comprises rhodium on the zirconia and the second layer comprises nickel on an alumina or magnesium- or calcium-aluminate.

5. The system of claim 1 wherein the first layer is between 5% and 25% of the thickness of the bed.

6. The system of claim 1 wherein the first layer is comprised of a rhodium impregnated zirconia catalyst.

7. The system of claim 1 wherein the first layer is comprised of a 0.05 to 0.5% wt rhodium impregnated zirconia catalyst.

8. The system of claim 1 wherein the second layer is comprised of a catalyst consisting of nickel on alumina or calcium aluminate.

9. The system of claim 1 wherein the zirconia of the oxidic support for the first layer is a magnesia-, calcia-, lanthana-, yttria- or ceria-stabilised zirconia.

10. The system of claim 1 wherein the zirconia of the oxidic support for the first layer is a magnesia-, calcia-, lanthana-, yttria- or ceria-stabilised cubic zirconia.

11. The system of claim 1 wherein the zirconia of the oxidic support for the first layer is an yttria-stabilised cubic zirconia.

12. The system of claim 1 wherein the first layer has a catalytic activity higher than that of the second layer.

13. The system of claim 1 wherein the second layer has a catalytic activity which is between 50 and 95% of the catalytic activity of the first layer.

14. The system of claim 1 wherein the first layer is on top of the second layer.

15. The system of claim 1, wherein the reformer vessel further comprises a burner apparatus, below which the bed of steam reforming catalyst is disposed.

* * * * *